(12) United States Patent
Tatsuwaki et al.

(10) Patent No.: US 12,194,826 B2
(45) Date of Patent: Jan. 14, 2025

(54) VEHICLE-MOUNTED BATTERY PACK

(71) Applicant: Honda Motor Co., Ltd., Tokyo (JP)

(72) Inventors: Masaaki Tatsuwaki, Saitama (JP); Ken Yasui, Saitama (JP); Ryo Ishizaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 580 days.

(21) Appl. No.: 17/511,535

(22) Filed: Oct. 26, 2021

(65) Prior Publication Data

US 2022/0144065 A1 May 12, 2022

(30) Foreign Application Priority Data

Nov. 11, 2020 (JP) ................................. 2020-188176

(51) Int. Cl.
*B60K 1/04* (2019.01)
*B60L 50/60* (2019.01)

(52) U.S. Cl.
CPC ............... *B60K 1/04* (2013.01); *B60L 50/66* (2019.02); *B60K 2001/0438* (2013.01); *B60Y 2306/01* (2013.01)

(58) Field of Classification Search
CPC .... B60K 1/04; B60K 2001/0438; B60L 50/66
See application file for complete search history.

(56) References Cited

U.S. PATENT DOCUMENTS

| | | | |
|---|---|---|---|
| 9,102,362 B2 | 8/2015 | Baccouche et al. | |
| 10,207,573 B2 | 2/2019 | Hara | |
| 10,780,923 B2 | 9/2020 | Caliskan et al. | |
| 11,034,229 B2 | 6/2021 | Kosuge | |
| 11,355,809 B2 * | 6/2022 | Matsushima | ....... H01M 50/244 |
| 2011/0151311 A1 | 6/2011 | Lee et al. | |
| 2015/0273995 A1 * | 10/2015 | Muto | ................... H01M 50/503 |
| | | | 180/68.5 |

FOREIGN PATENT DOCUMENTS

| | | |
|---|---|---|
| CN | 203876845 | 10/2014 |
| CN | 107379949 | 11/2017 |

(Continued)

OTHER PUBLICATIONS

"Office Action of Japan Counterpart Application", issued on Jun. 21, 2022, with English translation thereof, p. 1-p. 4.

(Continued)

*Primary Examiner* — Jason D Shanske
*Assistant Examiner* — James J Triggs
(74) *Attorney, Agent, or Firm* — JCIPRNET

(57) ABSTRACT

Provided is a vehicle-mounted battery pack. A vehicle-mounted battery pack includes: a battery case, a battery module, an upper cross member, and an upper deck. In the battery module, a first battery row and a second battery row, in which a plurality of vertically placed batteries are disposed in a case horizontal direction, are disposed in a pair in a case vertical direction. The upper cross member is disposed between the first battery row and the second battery row toward the case horizontal direction, and is fixed to a first stepped portion and a second stepped portion of the battery. The upper deck is disposed in the case vertical direction and is fixed to a front end portion and a rear end portion of the battery module.

20 Claims, 8 Drawing Sheets

(56) References Cited

FOREIGN PATENT DOCUMENTS

| | | |
|---|---|---|
| CN | 108454371 | 8/2018 |
| CN | 109318693 | 2/2019 |
| CN | 110329362 | 10/2019 |
| CN | 110884336 | 3/2020 |
| CN | 111497643 | 8/2020 |
| JP | H11303440 | 11/1999 |
| JP | 2005222939 | 8/2005 |
| JP | 2016219262 | 12/2016 |
| JP | 2018203029 | 12/2018 |
| JP | 2020035711 | 3/2020 |
| WO | 2012066874 | 5/2012 |

OTHER PUBLICATIONS

"Office Action of China Counterpart Application", issued on Nov. 22, 2023, with English translation thereof, p. 1-p. 18.

* cited by examiner

VEHICLE-MOUNTED BATTERY PACK

CROSS-REFERENCE TO RELATED APPLICATION

This application claims the priority benefit of Japan application serial no. 2020-188176, filed on Nov. 11, 2020. The entirety of the above-mentioned patent application is hereby incorporated by reference herein and made a part of this specification.

BACKGROUND

Technical Field

The disclosure relates to a vehicle-mounted battery pack.

Related Art

As a vehicle on which a battery pack is mounted, for example, a vehicle is known in which a vertical frame of a vehicle body is extended in a vehicle-body front-rear direction, a battery is vertically disposed along the vertical frame, and a cross member of the vehicle body is fixed to the vertical frame above the battery in a state of being extended in a vehicle width direction. According to the vehicle on which the battery pack is mounted, the rigidity and strength of the vehicle body can be ensured by fixing the cross member to the vertical frame (for example, see Patent Literature 1).

LITERATURE OF RELATED ART

Patent Literature

[Patent literature 1] U.S. patent Ser. No. 10/780,923 Specification

However, according to the vehicle described in Patent Literature 1, for example, it is necessary to connect the battery to the vertical frame and the cross member in consideration of the vibration of the battery and the like. Therefore, it is necessary to strengthen a connection member that connects the battery to the vertical frame and the cross member, which causes an increase in the weight.

SUMMARY

According to an embodiment, an object of the disclosure is to provide a vehicle-mounted battery pack capable of suppressing the vibration of a battery without increasing the weight.

According to an embodiment, the disclosure proposes a vehicle-mounted battery pack according to the disclosure includes: a battery case (for example, a battery case 86 of an embodiment) of which a vertical direction is disposed along a vehicle-body front-rear direction, and a horizontal direction is disposed along a vehicle width direction under the floor of a vehicle (for example, a vehicle Ve of the embodiment); a battery module (for example, a battery module 82 of the embodiment) in which at least a pair of battery rows (for example, a first battery row 127 and a second battery row 128 of the embodiment) is disposed in the vertical direction inside the battery case, wherein in the battery row, a plurality of vertically-long batteries (for example, a battery 85 of the embodiment) vertically disposed along the vertical direction are disposed in the horizontal direction; a horizontal frame (for example, an upper cross member 96 of the embodiment) which is disposed toward the horizontal direction between the battery rows disposed in the vertical direction, and is fixed to portions (for example, a first stepped portion 85a and a second stepped portion 85a of the embodiment) of the batteries facing each other in the vertical direction; and a vertical frame (for example, an upper deck 97 of the embodiment) which is disposed in the vertical direction, and is fixed to both end portions (for example, a front end portion 82a and a rear end portion 82b of the embodiment) of the battery module in the vertical direction. The horizontal frame and the vertical frame are formed in a cross shape in a plan view.

DESCRIPTION OF THE EMBODIMENTS

Figure 1:
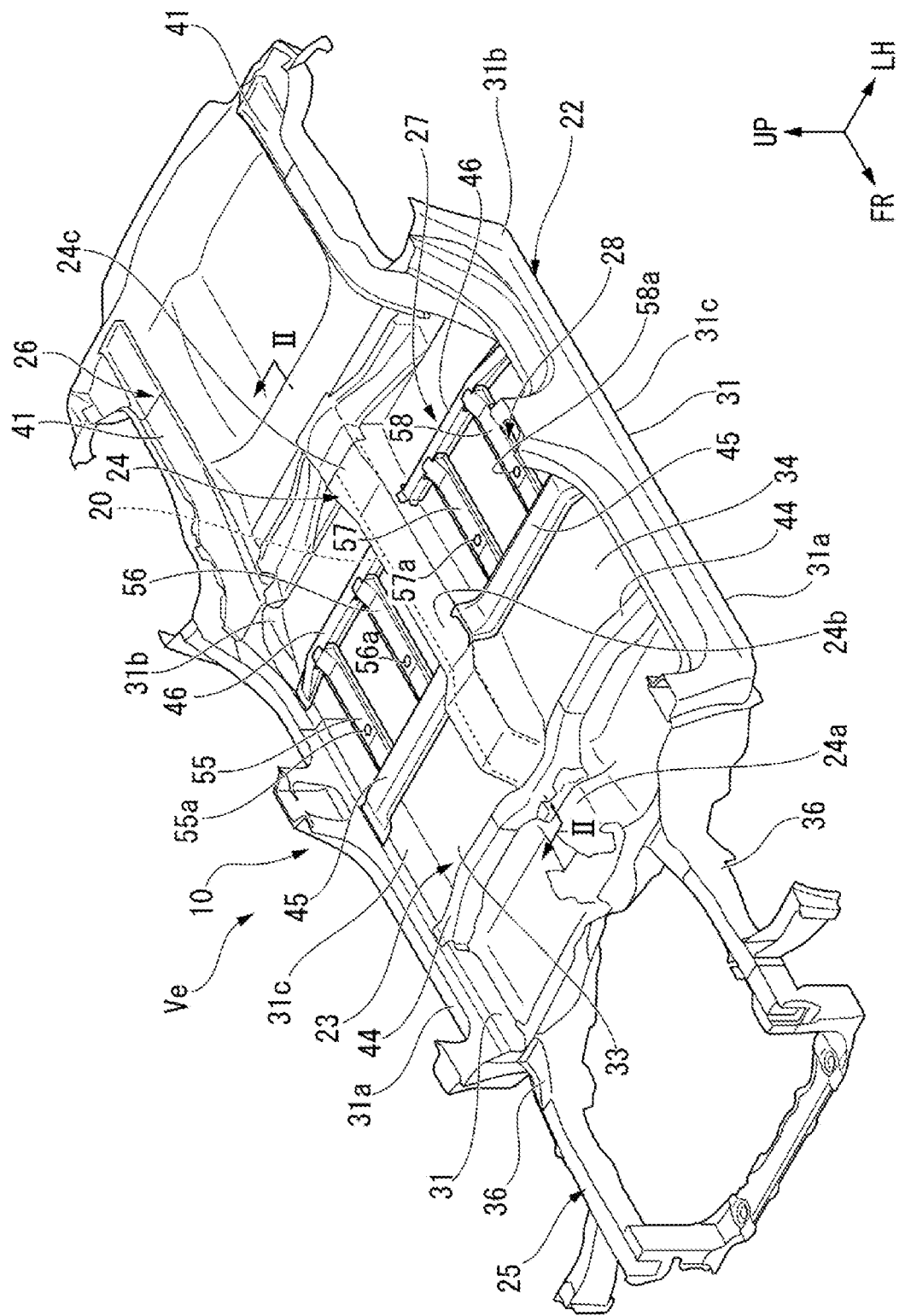
FIG. 1 is a perspective view showing a state in which a vehicle-mounted battery pack of one embodiment according to the disclosure is included in a vehicle.

Hereinafter, a vehicle-mounted battery pack according to one embodiment of the disclosure is described with reference to the drawings. In the drawings, an arrow FR indicates the front of a vehicle, an arrow UP indicates the upper side of the vehicle, and an arrow LH indicates the left side of the vehicle. In addition, the vehicle has a substantially symmetrical configuration. Therefore, hereinafter, the left and right constituent members are denoted by the same signs and described.

<Vehicle Main Body>

Figure 2:
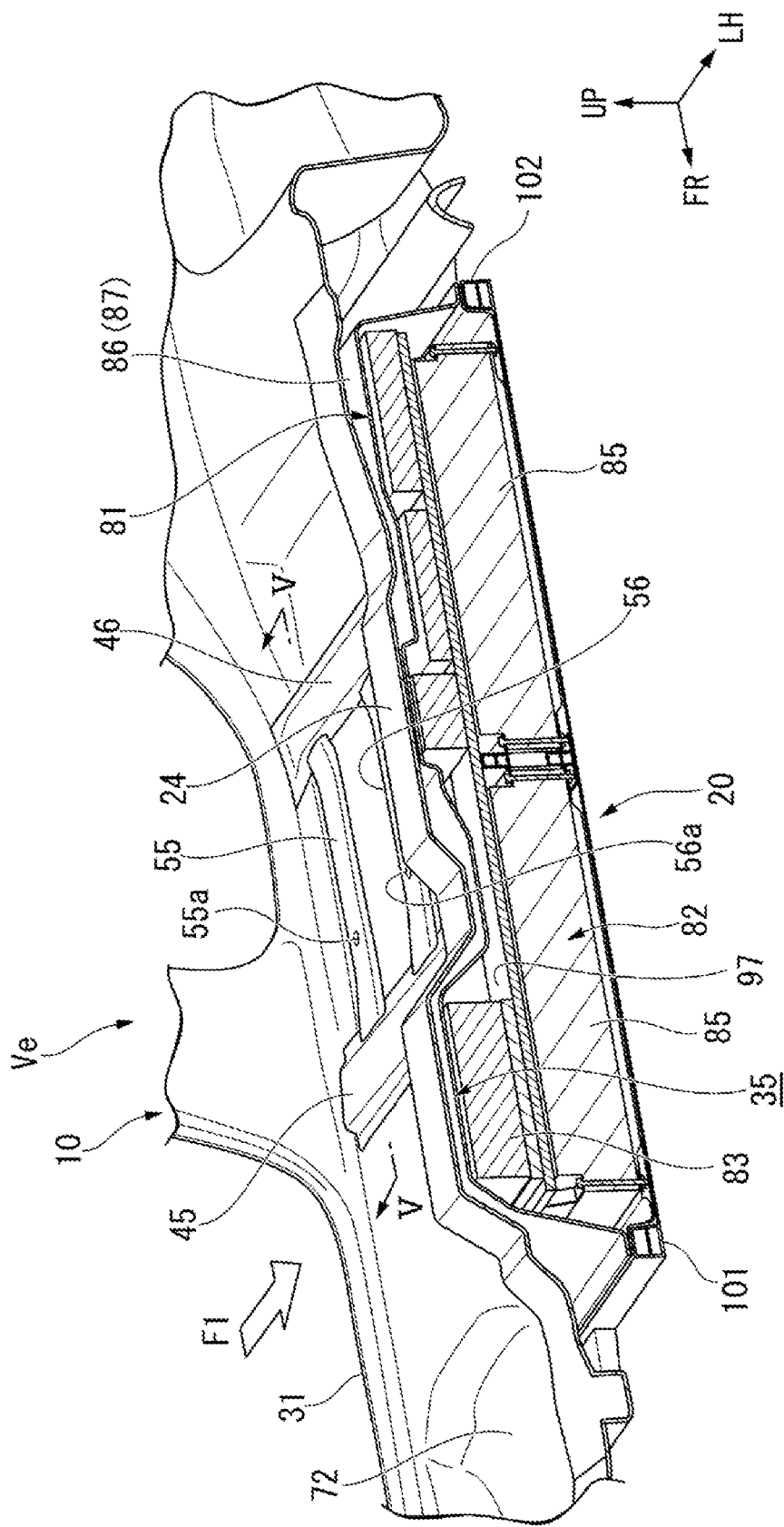
FIG. 2 is a perspective view in which the battery pack of FIG. 1 is broken by a II-II line.

As shown in FIGS. 1 and 2, a vehicle Ve includes a vehicle main body 10 (hereinafter, also referred to as a vehicle body 10) and a vehicle-mounted battery pack 20. Hereinafter, the vehicle-mounted battery pack 20 may be simply referred to as the battery pack 20.

The vehicle main body 10 includes: a side sill unit 22, a floor panel 23, a floor tunnel 24, a front side frame unit 25, a rear frame unit 26, a floor cross member unit 27, and a floor vertical frame unit 28.

The side sill unit 22 includes a right side sill (side sill) 31 and a left side sill (side sill) 31. The right side sill 31 is a high-rigidity member that is formed to have a closed cross section and constitutes a part of the skeleton of the vehicle body 10. The right side sill 31 is arranged on the right outer side in a vehicle width direction, and extends in a vehicle-body front-rear direction along the right outer side portion in the vehicle width direction of the floor panel 23.

The left side sill 31 is a high-rigidity member that is formed to have a closed cross section and constitutes a part of the skeleton of the vehicle body 10. The left side sill 31 is arranged on the left outer side in the vehicle width direction, and extends in the vehicle-body front-rear direction along the left outer side portion in the vehicle width direction of the floor panel 23.

The floor panel 23 is arranged between the left side sill 31 and the right side sill 31. The floor panel 23 is a plate-shaped member having a substantially rectangular shape in a plan view, and forms the floor portion of the vehicle body 10. The floor panel 23 includes a first floor portion 33 and a second floor portion 34.

The first floor portion 33 is arranged on the right side in the vehicle width direction between the right side sill 31 and the floor tunnel 24. The second floor portion 34 is arranged on the left side in the vehicle width direction between the left side sill 31 and the floor tunnel 24.

The floor tunnel 24 is extended in the vehicle-body front-rear direction between the first floor portion 33 and the second floor portion 34. The floor tunnel 24 is raised upward from the floor panel 23. Below the floor tunnel 24, a space 35 for accommodating a raised portion 87*a* of a case cover 87 described later is formed.

The front side frame unit 25 includes a front side frame 36 on the right side and a front side frame 36 on the left side. The front side frame 36 on the right side and the front side frame 36 on the left side are arranged at the front of the vehicle body of the battery pack 20.

The front side frame 36 on the right side extends from a front portion 31*a* of the right side sill 31 toward the front of the vehicle body. The front side frame 36 on the right side is a high-rigidity member that is formed to have a closed cross section and forms a part of the skeleton of the vehicle body 10.

The front side frame 36 on the left side extends from a front portion 31*a* of the left side sill 31 toward the front of the vehicle body. The front side frame 36 on the left side is a high-rigidity member that is formed to have a closed cross section and forms a part of the skeleton of the vehicle body 10.

The rear frame unit 26 includes a rear frame 41 on the right side and a rear frame 41 on the left side. The rear frame 41 on the right side and the rear frame 41 on the left side are arranged at the rear of the vehicle body of the battery pack 20.

The rear frame 41 on the right side extends from a rear end portion 31*b* of the right side sill 31 toward the rear of the vehicle body, and is formed in a substantially J-shape in a plan view. The rear frame 41 on the right side is a high-rigidity member that is formed to have a closed cross section and forms a part of the skeleton of the vehicle body 10.

The rear frame 41 on the left side extends from a rear end portion 31*b* of the left side sill 31 toward the rear of the vehicle body, and is formed in a substantially J-shape in a plan view. The rear frame 41 on the left side is a high-rigidity member that is formed to have a closed cross section and forms a part of the skeleton of the vehicle body 10.

The floor cross member unit 27 is disposed between the right side sill 31 and the left side sill 31, and is joined along the upper surface of the floor panel 23.

The floor cross member unit 27 includes: a first floor cross member 44 on the right side, a first floor cross member 44 on the left side, a second floor cross member 45 on the right side, a second floor cross member 45 on the left side, a third floor cross member 46 on the right side, and a third floor cross member 46 on the left side.

The first floor cross member 44 on the right side extends in the vehicle width direction on the first floor portion 33 between the vicinity of the front portion 31*a* of the right side sill 31 and a front portion 24*a* of the floor tunnel 24. The first floor cross member 44 on the right side is raised from the upper surface of the first floor portion 33 and forms a closed cross section together with the first floor portion 33.

The first floor cross member 44 on the left side extends in the vehicle width direction on the second floor portion 34 between the front portion 31*a* of the left side sill 31 and the front portion 24*a* of the floor tunnel 24. The first floor cross member 44 on the left side is raised from the upper surface of the second floor portion 34 and forms a closed cross section together with the second floor portion 34.

The second floor cross member 45 on the right side extends in the vehicle width direction between a center 31*c* of the right side sill 31 and a center 24*b* of the floor tunnel 24. The second floor cross member 45 on the right side is raised from the upper surface of the first floor portion 33 and forms a closed cross section together with the first floor portion 33.

The second floor cross member 45 on the left side extends in the vehicle width direction between a center 31*c* of the left side sill 31 and the center 24*b* of the floor tunnel 24. The second floor cross member 45 on the left side is raised from the upper surface of the second floor portion 34 and forms a closed cross section together with the second floor portion 34.

The third floor cross member 46 on the right side extends in the vehicle width direction on the first floor portion 33 between the vicinity of the rear end portion 31*b* of the right side sill 31 and the vicinity of a rear end portion 24*c* of the floor tunnel 24. The third floor cross member 46 on the right side is raised from the upper surface of the first floor portion 33 and forms a closed cross section together with the first floor portion 33. The third floor cross member 46 on the left side extends in the vehicle width direction on the second floor portion 34 between the vicinity of the rear end portion 31*b* of the left side sill 31 and the vicinity of the rear end portion 24*c* of the floor tunnel 24. The third floor cross member 46 on the left side is raised from the upper surface of the second floor portion 34 and forms a closed cross section together with the second floor portion 34.

The floor vertical frame unit 28 is equipped with a plurality of floor vertical frames, namely a first floor vertical frame 55, a second floor vertical frame 56, a third floor vertical frame 57, and a fourth floor vertical frame 58, on the floor panel 23 at intervals in the vehicle width direction. Specifically, the floor vertical frame unit 28 includes: the first floor vertical frame 55 and the second floor vertical frame 56 arranged on the first floor portion 33, and the third floor vertical frame 57 and the fourth floor vertical frame 58 arranged on the second floor portion 34.

The first floor vertical frame 55 and the second floor vertical frame 56 are arranged on the first floor portion 33 at an interval in the vehicle width direction, and form a closed cross section together with the first floor portion 33. With regard to the first floor vertical frame 55 and the second floor vertical frame 56, each front end portion thereof is joined (coupled) to the second floor cross member 45 on the right side, and each rear end portion thereof is joined (coupled) to the third floor cross member 46 on the right side. Note that, the number of the floor vertical frames arranged on the first floor portion 33 can be arbitrarily selected.

The third floor vertical frame 57 and the fourth floor vertical frame 58 are arranged on the second floor portion 34 at an interval in the vehicle width direction, and form a closed cross section together with the second floor portion 34. With regard to the third floor vertical frame 57 and the fourth floor vertical frame 58, each front end portion thereof is joined (coupled) to the second floor cross member 45 on the left side, and each rear end portion thereof is joined (coupled) to the third floor cross member 46 on the left side. Note that, the number of the floor vertical frames arranged on the second floor portion 34 can be arbitrarily selected.

<Battery Pack>

Figure 3:
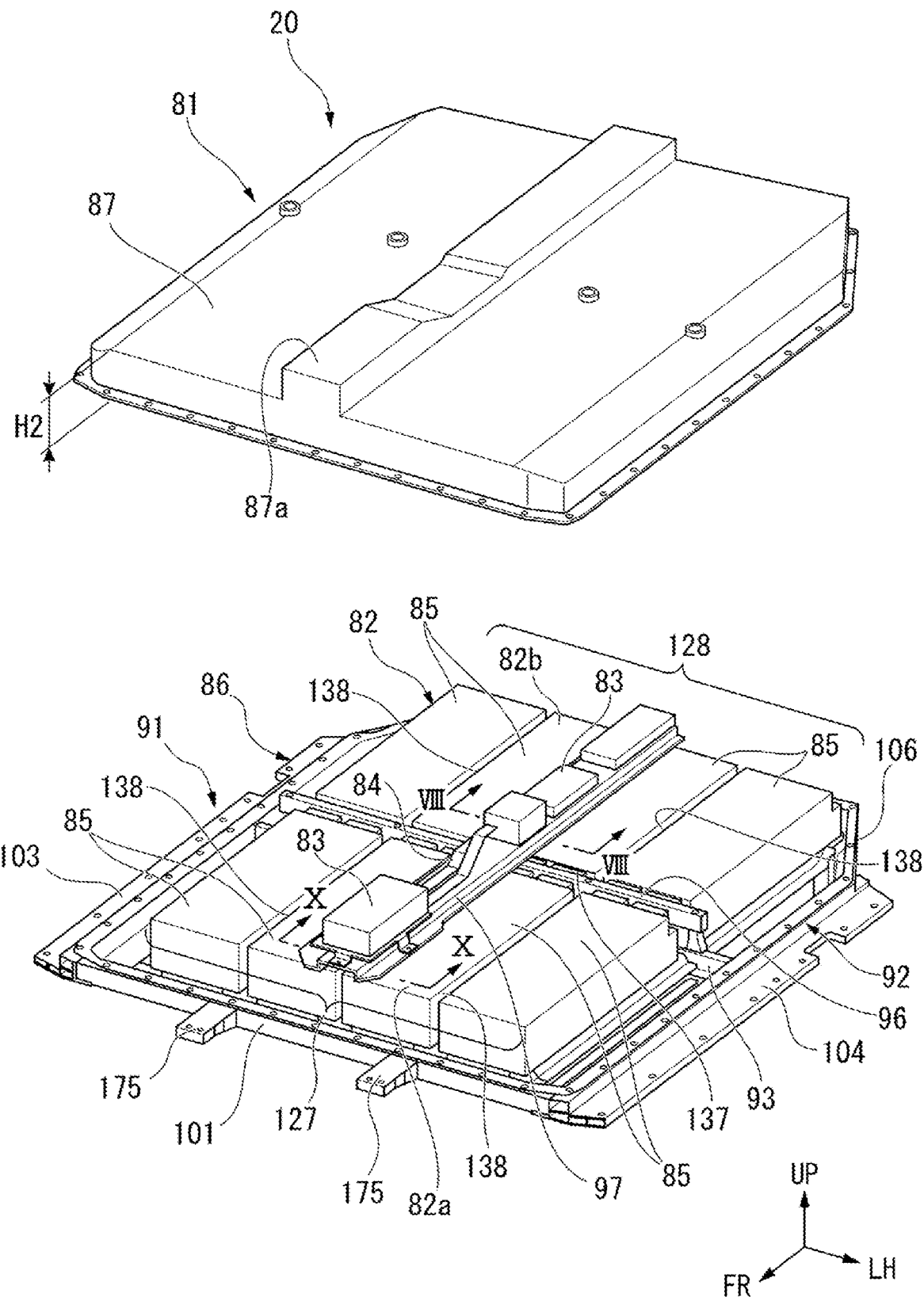
FIG. 3 is a perspective view showing a state in which a case cover is removed from the battery pack of one embodiment.
Figure 4:
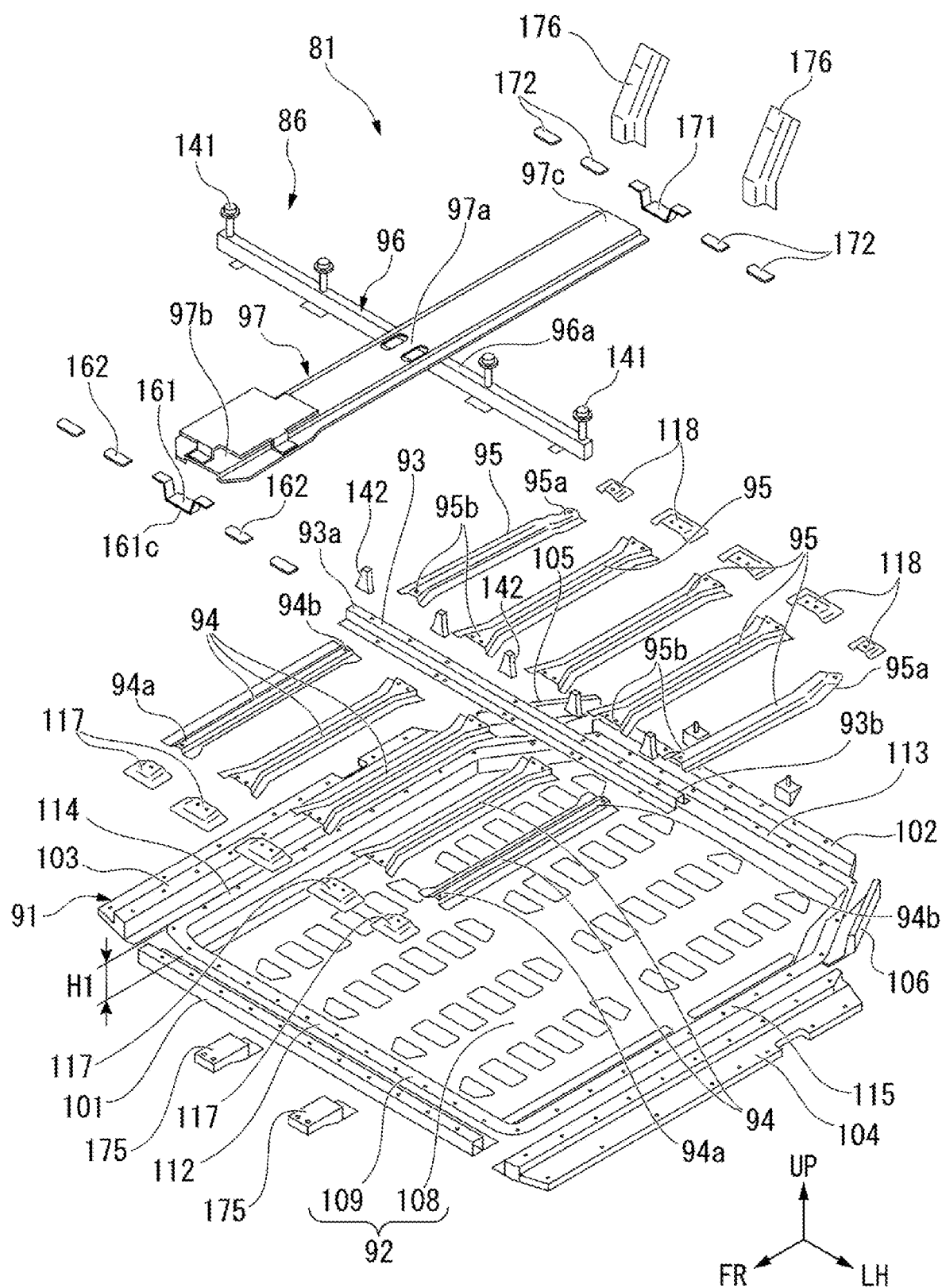
FIG. 4 is an exploded perspective view showing the battery pack of FIG. 3.

As shown in FIGS. 3 and 4, the battery pack 20 is arranged below the floor panel 23 (see FIG. 1) (that is, under the floor of the vehicle Ve). The battery pack 20 includes a case unit 81, a battery module 82, and a battery auxiliary machine 83.

(Battery Case)

Under the floor of the vehicle Ve (see FIG. 1), the vertical direction of the case unit 81 is disposed along the vehicle-body front-rear direction, and the horizontal direction of the case unit 81 is disposed along the vehicle width direction. Hereinafter, the vertical direction of the case unit 81 may be referred to as a "case vertical direction", and the horizontal direction of the case unit 81 may be referred to as a "case horizontal direction". In addition, the front, rear, left, and right directions of the battery pack 20 are described as the front of the vehicle body, the rear of the vehicle body, the right direction, and the left direction in the same manner as the vehicle body Ve.

The case unit 81 includes a battery case 86 formed in a rectangular shape and a case cover (cover) 87 that covers the battery case 86. The battery case 86 includes: a case frame portion 91, a case portion 92, a lower cross member (lower horizontal frame) 93, a first battery frame (battery frame) 94, a second battery frame (battery frame) 95, an upper cross member (horizontal frame) 96, and an upper deck (vertical frame) 97.

The case frame portion 91 includes: a front frame 101, a rear frame 102, a right side frame 103, a left side frame 104, a right inclined frame 105, and a left inclined frame 106.

The front frame 101 is disposed at the front of the vehicle body with an interval from the front edge of the battery module 82 and extends in the vehicle width direction. The rear frame 102 is disposed at the rear of the vehicle body with an interval from the rear edge of the battery module 82 and extends in the vehicle width direction.

The right side frame 103 is disposed on the right side in the vehicle width direction with an interval from the right side edge of the battery module 82, and extends from a right end portion of the front frame 101 toward the rear of the vehicle body. The right side frame 103 and the rear frame 102 are connected by the right inclined frame 105.

The left side frame 104 is disposed on the left side in the vehicle width direction with an interval from the left side edge of the battery module 82, and extends from a left end portion of the front frame 101 toward the rear of the vehicle body. The left side frame 104 and the rear frame 102 are connected by the left inclined frame 106.

The case frame portion 91 is formed in a substantially rectangular frame shape in a plan view by the front frame 101, the rear frame 102, the left side frame 104, the right side frame 103, the right inclined frame 105, and the left inclined frame 106. The case frame portion 91 is formed so as to cover the outer periphery of the battery module 82 with an interval.

The right side frame 103 is attached to the right side sill 31 (see FIG. 1) from below. The left side frame 104 is attached to the left side sill 31 (see FIG. 1) from below.

In addition, the case frame portion 91 is attached to the outer periphery of the case portion 92. The case portion 92 is attached to the inside of the case frame portion 91 and is arranged below the battery module 82.

Specifically, the case portion 92 has a case bottom (bottom (bottom surface) of the battery case 86) 108 and a case peripheral wall 109. In the case portion 92, a case recess is formed by the case bottom 108 and the case peripheral wall 109.

The case bottom 108 is disposed below the battery module 82 and is formed in a substantially rectangular shape in a plan view. The case bottom 108 forms the bottom of the case unit 81. The case peripheral wall 109 is formed along the outer periphery of the case bottom 108. The case peripheral wall 109 has a case front wall 112, a case rear wall 113, a case right wall 114, and a case left wall 115.

In the battery case 86, a recess in which the battery module 82 is disposed is formed by the case bottom 108 and the case peripheral wall 109. In the battery case 86, a battery case depth (that is, a case depth) H1 from the case bottom 108 to the upper end of the case peripheral wall 109 is formed to be shallower than a cover depth H2 of the case cover 87 described later.

The reason why the case depth H1 of the battery case 86 is made shallower than the cover depth H2 of the case cover 87 is described in detail later.

In the case portion 92, the lower cross member 93, a plurality of the first battery frames 94, and a plurality of the second battery frames 95 are arranged.

The lower cross member 93 is disposed in the center of the case bottom 108 of the case portion 92 in the case vertical direction (that is, the vehicle-body front-rear direction), and is disposed toward the case horizontal direction (that is, the vehicle width direction). With regard to the lower cross member 93, for example, a right end portion 93a is in contact with the case right wall 114, and a left end portion 93b is in contact with the case left wall 115.

Figure 5:
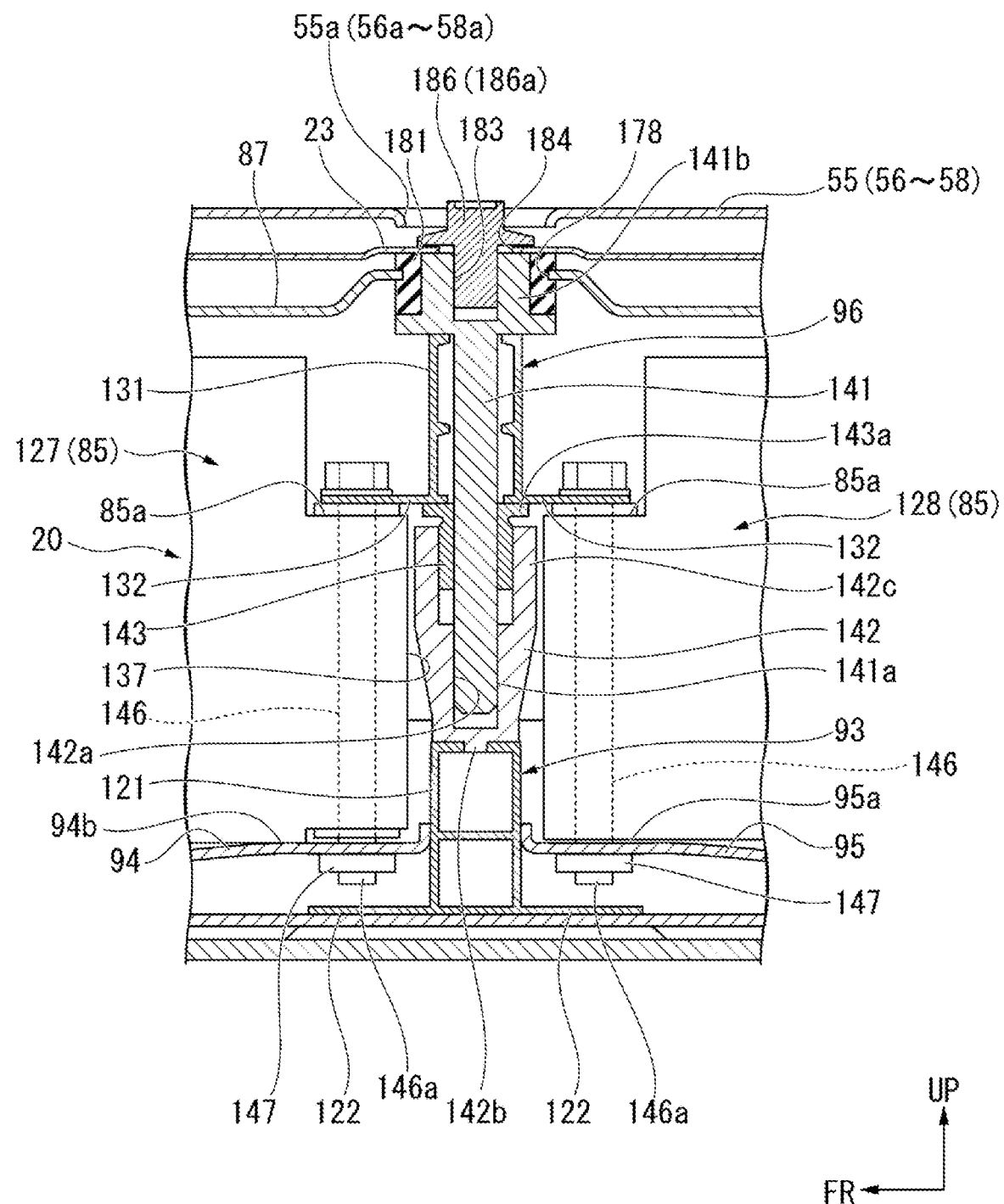
FIG. 5 is a cross-sectional view in which the battery pack of FIG. 2 is broken by a line V-V.
Figure 6:
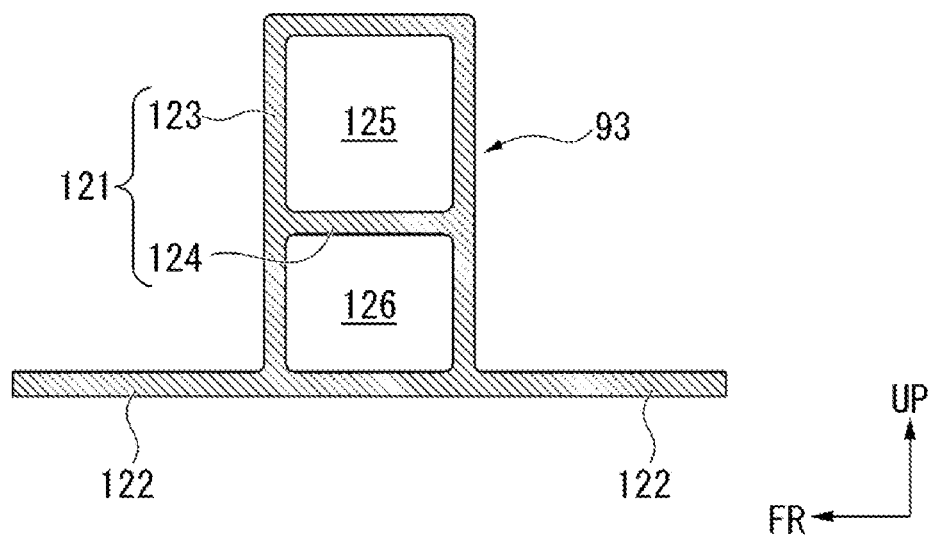
FIG. 6 is a cross-sectional view showing a lower cross member of the battery pack of one embodiment.

As shown in FIGS. 5 and 6, the lower cross member 93 has a second skeleton portion 121 extending in the case horizontal direction and a pair of second flanges 122 formed on the second skeleton portion 121.

The second skeleton portion 121 has, for example, a skeleton frame 123 formed to have a rectangular closed cross section, and a partition wall 124 formed in the center of the skeleton frame 123 in an up-down direction. The inside of the second skeleton portion 121 is partitioned by the partition wall 124, and thereby the second skeleton portion 121 is formed to have a hollow closed cross section having a first hollow portion 125 and a second hollow portion 126. The skeleton frame 123 is formed to have a closed cross section and the inside of the skeleton frame 123 is partitioned by the partition wall 124, and thereby the second skeleton portion 121 is formed into a portion having high rigidity.

For example, the pair of second flanges 122 projects in the case vertical direction from both side portions in the case vertical direction at the lower end portion of the second skeleton portion 121. For example, the lower cross member 93 is formed to have a T-shaped cross section by the second skeleton portion 121 and the pair of second flanges 122. Accordingly, the lower cross member 93 can be easily manufactured by, for example, pressing molding.

Returning to FIGS. 3 and 4, at the front of the vehicle body (in one of the case vertical directions) of the lower cross member 93 in the case bottom 108, the plurality of first battery frames 94 are arranged at intervals in the vehicle width direction (case horizontal direction). At the rear of the vehicle body (in the other of the case vertical directions) of the lower cross member 93 in the case bottom 108, the plurality of second battery frames 95 are arranged at intervals in the vehicle width direction (case horizontal direction).

The plurality of first battery frames 94 and the plurality of second battery frames 95 are disposed at intervals in the vehicle-body front-rear direction (case vertical direction), and are disposed on the same line toward the vehicle-body front-rear direction. The lower cross member 93 is arranged between the plurality of first battery frames 94 and the plurality of second battery frames 95.

In the embodiment, one lower cross member 93 is exemplified, but the number of the lower cross member 93 can be appropriately selected. In addition, in the embodiment, five first battery frames 94 are exemplified as the plurality of first battery frames 94, and five second battery frames 95 are exemplified as the plurality of second battery frames 95, but the number of the first battery frame 94 and the second battery frame 95 can be appropriately selected.

A front end portion 94a of the first battery frame 94 is attached to the front frame 101 by a first attachment bracket 117 via the case bottom 108. In addition, a rear end portion 94b of the first battery frame 94 is attached (connected) to the lower cross member 93.

A battery 85 is vertically disposed between a pair of the adjacent first battery frames 94, and the vertically disposed battery 85 is supported by the pair of first battery frames 94. Accordingly, by the plurality of first battery frames 94, a plurality of the batteries 85 are supported in a state of being disposed in the case width direction.

A rear end portion 95a of the second battery frame 95 is attached to the rear frame 102 by a second attachment bracket 118 via the case bottom 108. In addition, a front end portion 95b of the second battery frame 95 is attached (connected) to the lower cross member 93.

The battery 85 is vertically disposed between a pair of the adjacent second battery frames 95, and the vertically disposed battery 85 is supported by the pair of second battery frames 95. Accordingly, by the plurality of second battery frames 95, a plurality of the batteries 85 are supported in a state of being disposed in the case width direction.

That is, the battery module 82 described later is fixed to the plurality of first battery frames 94 and the plurality of second battery frames 95. Accordingly, the vertically-long batteries 85 which are vertically disposed along the case vertical direction can be stably fixed by the plurality of first battery frames 94 and the plurality of second battery frames 95.

The battery 85 is formed in a vertically-long rectangular body by stacking a plurality of battery cells (not shown) in a longitudinal direction. Hereinafter, the battery 85 which is vertically-long may be referred to as "the vertically-long battery 85".

In addition, vertically disposing the vertically-long battery 85 means disposing the longitudinal direction of the battery 85 toward the vehicle-body front-rear direction (case vertical direction).

In this way, the plurality of first battery frames 94 and the plurality of second battery frames 95 are arranged toward the vehicle-body front-rear direction at intervals in the vehicle-body front-rear direction at the case bottom 108 of the case portion 92. Furthermore, the lower cross member 93 is arranged between the plurality of first battery frames 94 and the plurality of second battery frames 95.

Therefore, in case regions at the front and the rear of the vehicle body of the lower cross member 93, the plurality of vertically-long batteries 85 can be vertically disposed toward the vehicle-body front-rear direction along the plurality of first battery frames 94 and the plurality of second battery frames 95. Accordingly, the plurality of vertically-long batteries 85 can be vertically disposed with high efficiency, and thus a sufficient cruising distance can be ensured.

(Battery Module)

At the front of the vehicle body of the lower cross member 93, the plurality of batteries 85 on the front side are vertically supported by the plurality of first battery frames 94. A first battery row (battery row) 127 is configured by the plurality of batteries 85 vertically supported by the plurality of first battery frames 94.

At the rear of the vehicle body of the lower cross member 93, the plurality of batteries 85 on the rear side are vertically supported by the plurality of second battery frames 95. A second battery row (battery row) 128 is configured by the plurality of batteries 85 vertically supported by the plurality of second battery frames 95.

The first battery row 127 and the second battery row 128 are disposed in a pair in the vehicle-body front-rear direction (case vertical direction). By the first battery row 127 (that is, the plurality of batteries 85 on the front side) and the second battery row 128 (that is, the plurality of batteries 85 on the rear side), for example, the battery module 82 for driving is configured.

In a state in which the longitudinal direction is vertically disposed toward the vehicle-body front-rear direction, the plurality of vertically-long batteries 85 of the battery module 82 are supported by the plurality of first battery frames 94 and the plurality of second battery frames 95.

In the embodiment, an example is described in which the first battery row 127 and the second battery row 128 are disposed in a pair in the vehicle-body front-rear direction (case vertical direction), but the disclosure is not limited hereto. As another example, three or more battery rows may be disposed in the vehicle-body front-rear direction.

The battery module 82 has a first boundary portion 137 disposed between the first battery row 127 and the second battery row 128, and a second boundary portion 138 extending in the vehicle-body front-rear direction (case vertical direction). The first boundary portion 137 extends toward the vehicle width direction (case horizontal direction) along the lower cross member 93. The second boundary portion 138 extends toward the vehicle-body front-rear direction (case vertical direction) along the first battery frame 94 and the second battery frame 95.

On the upper portion side of the battery module 82, the upper cross member (horizontal frame) 96 is disposed in a position corresponding to the first boundary portion 137. In other words, the upper cross member 96 is disposed toward the case horizontal direction between the first battery row 127 and the second battery row which are disposed at an interval in the case vertical direction.

The upper cross member 96 is arranged along the lower cross member 93 and is formed to have the same cross section as the lower cross member 93.

Figure 7:
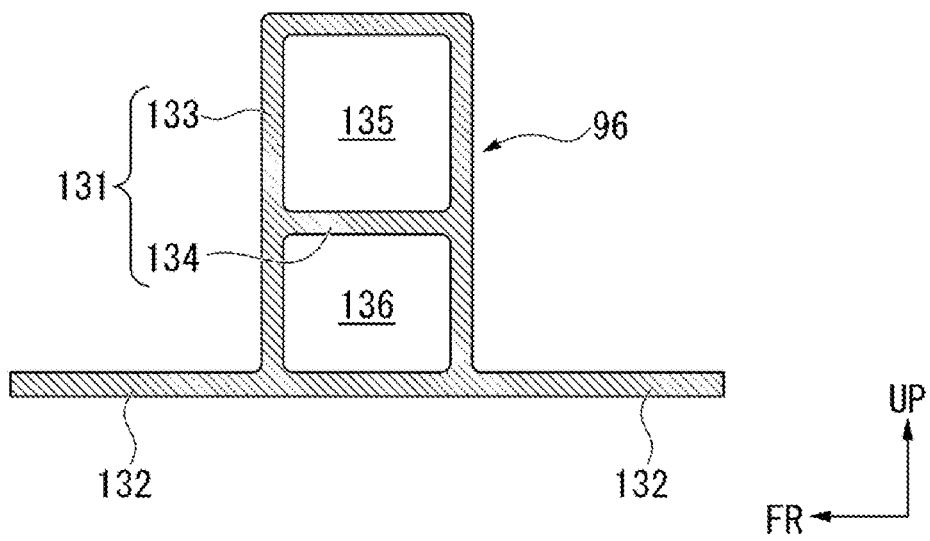
FIG. 7 is a cross-sectional view showing an upper cross member of the battery pack of one embodiment.

As shown in FIGS. 5 and 7, the upper cross member 96 has a first skeleton portion 131 extending in the case horizontal direction and a pair of first flanges 132 formed on the first skeleton portion 131.

For example, similar to the second skeleton portion 121, the first skeleton portion 131 has a skeleton frame 133 formed to have a rectangular closed cross section, and a partition wall 134 formed in the center of the skeleton frame 133 in the up-down direction. The skeleton frame 133 is partitioned by the partition wall 134, and thereby the first skeleton portion 131 is formed to have a hollow closed cross section having a first hollow portion 135 and a second hollow portion 136. The first skeleton portion 131 is formed to have a closed cross section and the inside of the skeleton frame 133 is partitioned by the partition wall 134, and thereby the first skeleton portion 131 is formed into a portion having high rigidity.

For example, similar to the pair of second flanges 122, the pair of first flanges 132 projects in the case vertical direction from both side portions in the case vertical direction at the lower end portion of the first skeleton portion 131. For example, similar to the lower cross member 93, the upper cross member 96 is formed to have a T-shaped cross section by the first skeleton portion 131 and the pair of first flanges 132. Accordingly, the upper cross member 96 can be easily manufactured by, for example, pressing molding.

The upper cross member 96 is coupled to the lower cross member 93 via an attachment bolt 141, a first connection collar 142 and a second connection collar 143. That is, the attachment bolt 141 penetrates through the first skeleton portion 131 of the upper cross member 96. A screw portion 141*a* of the attachment bolt 141 penetrating through the first skeleton portion 131 is screwed into a screw hole 142*a* of the first connection collar 142. Therefore, the upper cross member 96 is connected to the first connection collar 142 via the attachment bolt 141.

A lower end portion 142*b* of the first connection collar 142 is coupled to the second skeleton portion 121 (specifically, the upper end portion of the second skeleton portion 121) of the lower cross member 93. In addition, the second connection collar 143 is screw-coupled to an upper portion 142*c* of the first connection collar 142. The screw coupling of the second connection collar 143 is adjusted, and thereby a collar flange 143*a* of the second connection collar 143 is in contact with the first skeleton portion 131 (specifically, the lower end portion of the first skeleton portion 131) of the upper cross member 96.

Accordingly, the first skeleton portion 131 of the upper cross member 96 is connected to the second skeleton portion 121 of the lower cross member 93 via the attachment bolt 141, the first connection collar 142, and the second connection collar 143.

In this state, the pair of first flanges 132 of the upper cross member 96 are mounted on a stepped portion 85*a* of the battery 85 constituting the first battery row 127 and a stepped portion 85*a* of the battery 85 constituting the second battery row 128. Hereinafter, the stepped portion 85*a* of the battery 85 constituting the first battery row 127 is described as a "first stepped portion 85*a*", and the stepped portion 85*a* of the battery 85 constituting the second battery row 128 is described as a "second stepped portion 85*a*". The first stepped portion 85*a* and the second stepped portion 85*a* are portions of the plurality of batteries 85 facing each other in the case vertical direction.

An attachment bolt 146 penetrates through the front first flange 132 of the pair of first flanges 132, the first stepped portion 85*a*, and the rear end portion 94*b* of the first battery frame 94. A screw portion 146*a* protruding downward from the rear end portion 94*b* of the first battery frame 94 is screw-coupled to a welding nut 147. Therefore, the front first flange 132 of the upper cross member 96 is fixed to the first stepped portion 85*a* by the attachment bolt 146.

The attachment bolt 146 penetrates through the rear first flange 132 of the pair of first flanges 132, the second stepped portion 85*a*, and the front end portion 95*b* of the second battery frame 95. The screw portion 146*a* protruding downward from the second battery frame 95 is screw-coupled to the welding nut 147. Therefore, the rear first flange 132 of the upper cross member 96 is fixed to the second stepped portion 85*a* by the attachment bolt 146.

Accordingly, the upper cross member 96 is fixed to the first stepped portion 85*a* and the second stepped portion 85*a*. Therefore, at the first boundary portion 137, the plurality of batteries 85 facing each other in the case vertical direction are fixed from above by the upper cross member 96. Specifically, by the upper cross member 96, in the center of the battery module 82 in the vehicle-body front-rear direction (case vertical direction), the plurality of batteries 85 disposed in the vehicle-body front-rear direction are connected, and the plurality of batteries 85 disposed in the vehicle width direction (case horizontal direction) are connected.

In addition, the rear end portion 94*b* of the first battery frame 94 is coupled to the lower cross member 93. Furthermore, the front end portion 95*b* of the second battery frame 95 is coupled to the lower cross member 93. Therefore, the plurality of batteries 85 facing each other in the case vertical direction are supported (fixed) from below by the lower cross member 93.

Accordingly, the plurality of batteries 85 facing each other in the case vertical direction (that is, the battery module 82) are sandwiched between the upper cross member 96 and the lower cross member 93 in the up-down direction. Thus, the battery module 82 is fixed in a state of being sandwiched between the upper cross member 96 and the lower cross member 93 that are disposed up and down.

Furthermore, the first skeleton portion 131 of the upper cross member 96 and the second skeleton portion 121 of the lower cross member 93 are connected via the attachment bolt 141, the first connection collar 142, and the second connection collar 143. The first skeleton portion 131 and the second skeleton portion 121 are, for example, portions having high rigidity that are formed to have a closed cross section. Accordingly, the battery module 82 can be firmly fixed by the upper cross member 96 and the lower cross member 93.

Figure 8:
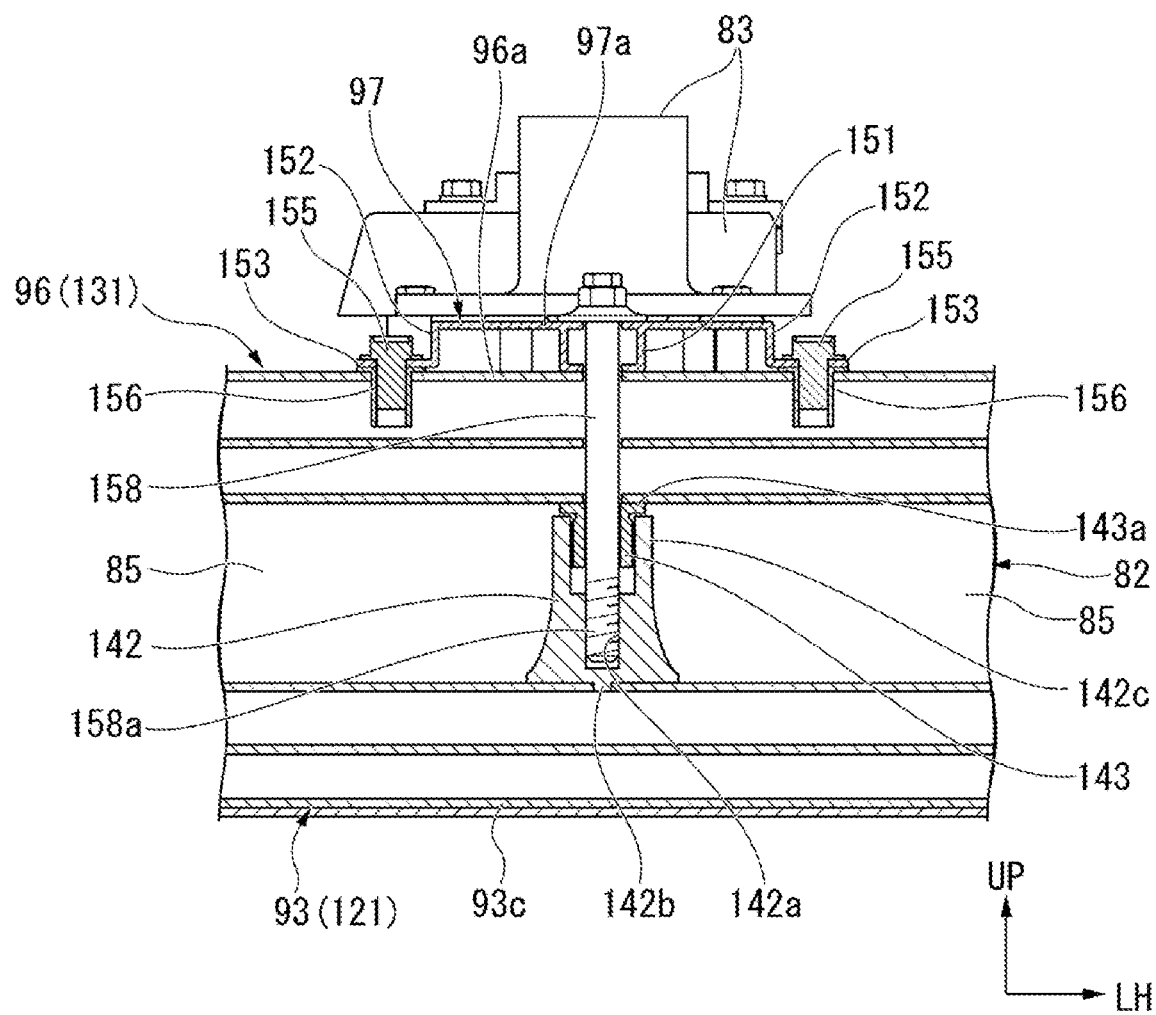
FIG. 8 is a cross-sectional view in which the battery pack of FIG. 3 is broken by a line VIII-VIII.
Figure 10:
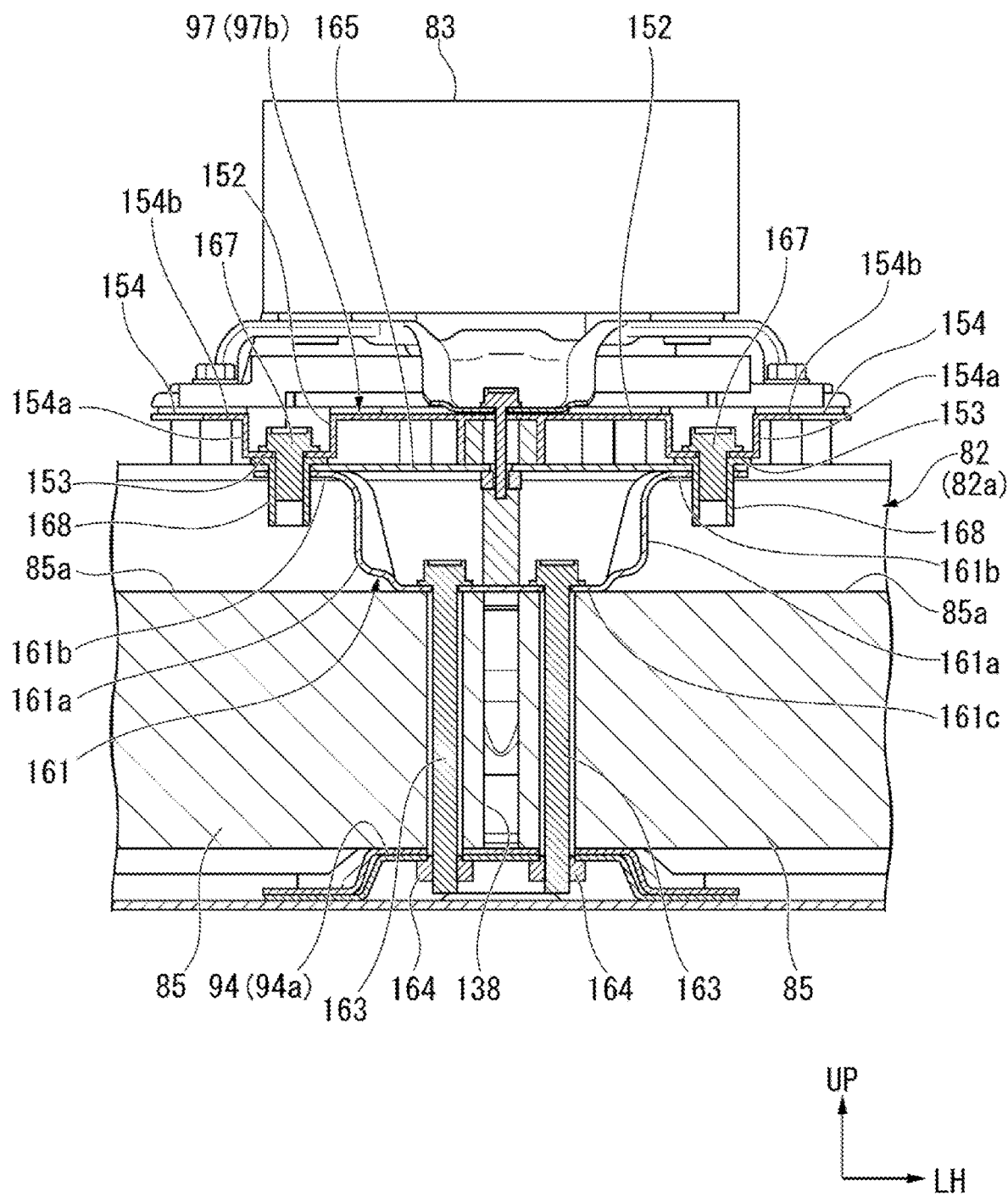
FIG. 10 is a cross-sectional view in which the battery pack of FIG. 3 is broken by a line X-X.

As shown in FIGS. 3, 4, and 8, above the plurality of batteries 85 (that is, the battery module 82), the upper deck 97 is arranged at the second boundary portion 138 in the center of the vehicle width direction of the plurality of second boundary portions 138 (also see FIG. 10).

The upper deck 97 is disposed along the first battery frame 94 and the second battery frame 95. Furthermore, the upper deck 97 is disposed in a way of extending toward the vehicle-body front-rear direction (case vertical direction) so as to intersect with (in the embodiment, be orthogonal to) the upper cross member 96 and the lower cross member 93.

Figure 9:
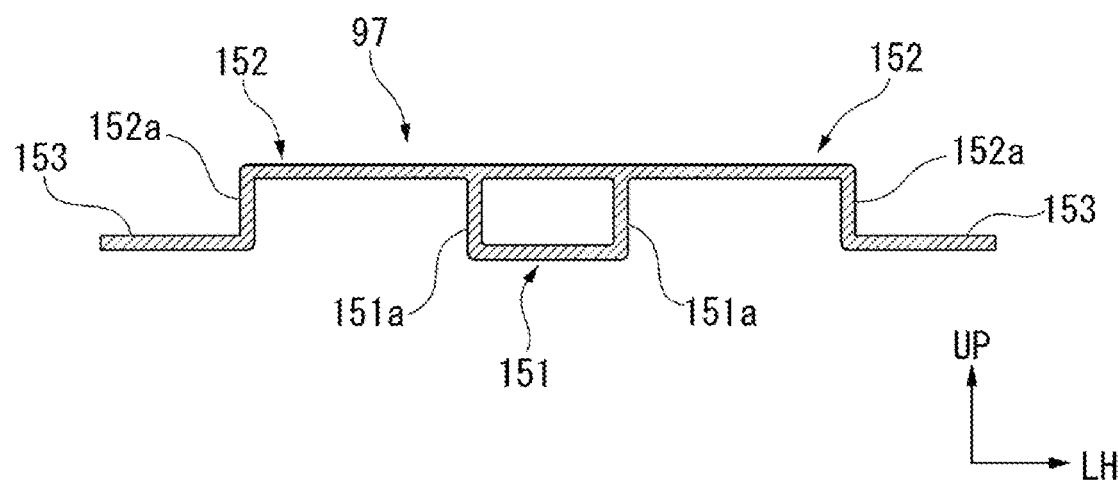
FIG. 9 is a cross-sectional view showing an upper deck of the battery pack of one embodiment.

As shown in FIGS. 4 and 9, the upper deck 97 has a skeleton portion 151 extending in the case vertical direction and a pair of crank portions 152 formed on the skeleton portion 151.

For example, the skeleton portion 151 is formed to have a rectangular closed cross section. By being formed to have a rectangular closed cross section, the skeleton portion 151 is formed into a high-rigidity portion that has two first vertical walls (wall surfaces) 151*a*. The two first vertical walls 151*a* extend in the case vertical direction.

For example, the pair of crank portions 152 projects in the case horizontal direction from both side portions in the case horizontal direction at the upper end portion of the skeleton portion 151. The pair of crank portions 152 have two second vertical walls (vertical walls) 152*a* by being formed in a crank shape. The two second vertical walls 152*a* extend in the case vertical direction. Therefore, in the upper deck 97, four vertical walls are formed by the two first vertical walls 151a and the two second vertical walls 152a. Accordingly, it is possible to ensure high bending rigidity of the upper deck 97 against the bending stress of the battery case 86 toward the up-down direction.

Returning to FIGS. 3, 4, and 8, a portion (that is, a central portion in the case vertical direction) 97a of the upper deck 97 that intersects with the upper cross member 96 is fixed to a central portion 96a of the upper cross member 96 in the case horizontal direction. Specifically, in the central portion 97a of the upper deck 97, an attachment bolt 155 penetrates through each flange 153 of the pair of crank portions 152 and is screw-coupled to a pair of fixing nuts 156. The pair of fixing nuts 156 are fixed to the central portion 96a of the upper cross member 96.

Accordingly, the central portion 97a of the upper deck 97 is fixed to the central portion 96a of the upper cross member 96 by the pair of attachment bolts 155 and the pair of fixing nuts 156.

Therefore, the central portion 96a of the upper cross member 96 can be reinforced by the upper deck 97, and the central portion 97a of the upper deck 97 can be reinforced by the upper cross member 96. Accordingly, the vertically-long batteries 85 vertically disposed along the case vertical direction can be stably fixed by the upper cross member 96 and the upper deck 97.

In addition, the central portion 97a of the upper deck 97 is fixed to a central portion 93c of the lower cross member 93 in the case horizontal direction. Specifically, in the central portion 97a of the upper deck 97, an attachment bolt 158 penetrates through the skeleton portion 151. A screw portion 158a of the attachment bolt 158 penetrating through the skeleton portion 151 is screw-coupled to the screw hole 142a of the first connection collar 142. Therefore, the upper cross member 96 is connected to the first connection collar 142 via the attachment bolt 158.

As described above, the lower end portion 142b of the first connection collar 142 is coupled to the second skeleton portion 121 (specifically, the upper end portion of the second skeleton portion 121) of the lower cross member 93. In addition, the second connection collar 143 is screw-coupled to the upper portion 142c of the first connection collar 142. The screw coupling of the second connection collar 143 is adjusted, and thereby the collar flange 143a of the second connection collar 143 is in contact with the first skeleton portion 131 (specifically, the lower end portion of the first skeleton portion 131) of the upper cross member 96.

Accordingly, with regard to the upper deck 97, the first skeleton portion 131 is connected to the second skeleton portion 121 of the lower cross member 93 via the attachment bolt 158, the first connection collar 142, and the second connection collar 143.

As shown in FIGS. 3, 4, and 10, in the upper deck 97, for example, projecting portions 154 are respectively formed integrally with the pair of crank portions 152 (specifically, the flange 153) at front end portions 97b in the case vertical direction. The pair of projecting portions 154 are respectively formed to have an L-shaped cross section. The projecting portion 154 has a third vertical wall 154a and a projecting flange 154b. A deck recess is formed by the second vertical wall 152a, the flange 153, and the third vertical wall 154a.

A front connection bracket (bracket) 161 is arranged below the front end portion 97b of the upper deck 97.

The front connection bracket 161 has a bracket recess 161a extending in the case vertical direction at the front end portion 97b of the upper deck 97, and a pair of bracket flanges 161b formed in the bracket recess 161a.

A bottom 161c of the bracket recess 161a is mounted on the stepped portion 85a of the pair of batteries 85 disposed adjacent to each other in the vehicle width direction at a front end portion (one of both end portions) 82a of the battery module 82. A pair of attachment bolts 163 penetrates through the bottom 161c of the bracket recess 161a. The pair of attachment bolts 163 penetrates through the stepped portion 85a of the pair of batteries 85 disposed adjacent to each other in the vehicle width direction and the front end portion 94a of the first battery frame 94, and is screw-coupled to welding nuts 164. The welding nut 164 is welded to the lower surface of the front end portion 94a of the first battery frame 94.

Accordingly, by the front connection bracket 161, the plurality of batteries 85 disposed in the vehicle width direction (case horizontal direction) are fixed in a connected state by being clamped together with the first battery frame 94 at the front end portion 82a of the battery module 82.

A connection plate 165 is mounted on the pair of bracket flanges 161b. On the connection plate 165, a pair of deck recesses (specifically, flanges 153) of the upper deck 97 are mounted so as to overlap the pair of bracket flanges 161b in the up-down direction.

An attachment bolt 167 penetrates through the deck recess, the connection plate 165, and the bracket flange 161b. The attachment bolt 167 is screw-coupled to a fixing nut 168. The fixing nut 168 is welded to, for example, the bracket flange 161b.

Therefore, the pair of flanges 153 of the upper deck 97 are attached to the connection plate 165 and the pair of bracket flanges 161b via the pair of attachment bolts 167 and the pair of fixing nuts 168. Here, a closed cross section having high rigidity is formed by the connection plate 165 and the bracket recess 161a. Therefore, the front end portion 97b of the upper deck 97 is firmly fixed to the front connection bracket 161. Accordingly, the front end portion 97b of the upper deck 97 is firmly connected to the front end portion 82a of the battery module 82 via the front connection bracket 161.

As described above, the bracket recess 161a of the front connection bracket 161 is attached to the front end portion 82a of the battery module 82 by the pair of attachment bolts 163 and the pair of welding nuts 164. In addition, the front end portion 97b of the upper deck 97 is firmly fixed to the front connection bracket 161 by the pair of attachment bolts 167, the pair of fixing nuts 168, and the like. Accordingly, the front end portion 97b of the upper deck 97 is fixed to the front end portion 82a of the battery module 82 via the front connection bracket 161 and the like.

In addition, the front end portion 82a of the battery module 82 is sandwiched and fixed by the front end portion 94a of the first battery frame 94 and the front end portion 97b of the upper deck 97.

Here, at the front end portion 82a of the battery module 82, the battery 85 located closer to the case horizontal direction than the front end portion 97b of the upper deck 97 is connected by a front connection bracket 162 in the same manner as the front connection bracket 161. For example, the front connection bracket 162 is formed in the same manner as the bottom 161c of the bracket recess 161a of the front connection bracket 161.

That is, similar to the front connection bracket 161, the front connection bracket 162 clamps the batteries 85 adjacent to each other in the case horizontal direction together with the front end portion 94a of the first battery frame 94 by the pair of attachment bolts 163 and the pair of welding nuts 164. Therefore, the batteries 85 adjacent to each other in the case horizontal direction are fixed in a connected state.

Accordingly, at the front end portion 82a of the battery module 82, the plurality of batteries 85 adjacent to each other in the case width direction are firmly connected by the front connection bracket 161, the plurality of front connection brackets 162, and the like.

In addition, in the battery module 82, similar to the front end portion 82a, the pair of batteries 85 adjacent to each other in the case horizontal direction at a rear end portion 82b are fixed in a state of being sandwiched by a rear connection bracket (bracket) 171 and the rear end portion 95a of the second battery frame 95. The rear end portion 82b of the battery module 82 is the other portion of both end portions of the battery module 82.

Furthermore, similar to the front end portion 97b, a rear end portion 97c of the upper deck 97 is firmly fixed to the rear connection bracket 171.

Accordingly, the rear end portion 97c of the upper deck 97 is firmly connected to the rear end portion 82b of the battery module 82 via the rear connection bracket 171.

In addition, similar to the front end portion 82a, the rear end portion 82b of the battery module 82 is sandwiched and fixed by the rear end portion 95a of the second battery frame 95 and the rear end portion 97c of the upper deck 97.

Furthermore, at the rear end portion 82b of the battery module 82, the battery 85 located closer to the case horizontal direction than the rear end portion 97c of the upper deck 97 is firmly connected by a rear connection bracket 172 or the like.

In this way, the front end portion 97b and the rear end portion 97c of the upper deck 97 are respectively fixed to the front end portion 82a and the rear end portion 82b (that is, both end portions in the case vertical direction) of the battery module 82. In addition, the front end portion 82a of the battery module 82 is sandwiched and fixed by the front end portion 94a of the first battery frame 94 and the front end portion 97b of the upper deck 97. Furthermore, the rear end portion 82b of the battery module 82 is sandwiched and fixed by the rear end portion 95a of the second battery frame 95 and the rear end portion 97c of the upper deck 97.

(Battery Auxiliary Machine)

As shown in FIGS. 2 and 3, the battery auxiliary machine 83 such as a high-voltage junction board, an electronic control unit (ECU), or the like is mounted on the upper deck 97.

A high-voltage junction board is, for example, an auxiliary machine that supplies electricity of the battery module 82 for driving to a motor for driving (not shown). The ECU is, for example, a battery management unit that controls the discharging and charging between the battery module 82 for driving and the motor for driving.

Here, when the battery pack 20 is disposed under the floor of the vehicle Ve, for example, the case vertical direction of the battery case 86 is disposed along the vehicle-body front-rear direction. In addition, the upper deck 97 is disposed along the case vertical direction of the battery case 86. Therefore, for example, the upper deck 97 can be disposed along the lower side of the floor tunnel 24 of the vehicle Ve.

Thus, the battery auxiliary machine 83 is mounted on the upper deck 97. Therefore, the battery auxiliary machine 83 can be stored in the space 35 of the floor tunnel 24 from below. Accordingly, for example, the battery case 86 (that is, the battery pack 20) can be miniaturized compared with the case where, for example, the battery auxiliary machine 83 is disposed on the front side or the like of the vehicle body of the battery module 82.

In addition, by mounting the battery auxiliary machine 83 on the upper deck 97, the width of the battery module 82 in the case horizontal direction can be suppressed to be small. Therefore, an allowable deformation space (that is, a space for deformation stroke) can be set to be large from the outer edge of the battery module 82 toward the outer side in the vehicle width direction.

Accordingly, for example, when a load (that is, a side collision load) F1 is input to the side portion of the vehicle Ve due to a side collision, side collision energy generated due to the side collision can be sufficiently absorbed in the allowable deformation space, and the battery module 82 can be protected from the side collision load F1.

In a state where the battery module 82, the battery auxiliary machine 83, and the like are accommodated in the battery case 86, the case cover 87 is attached to the case frame 91 from above. Accordingly, the battery pack 20 is assembled. In this state, the battery module 82, the battery auxiliary machine 83, and the like accommodated in the battery case 86 are covered by the case cover 87 from above.

In addition, on the case cover 87, the raised portion 87a is formed along the upper deck 97. The battery auxiliary machine 83 and the like are accommodated below the raised portion 87a.

(Assembly of Battery Pack 20 Under Floor of Vehicle)

As shown in FIGS. 1 to 3, the right side frame 103 of the battery case 86 is attached to the right side sill 31 from below. The left side frame 104 of the battery case 86 is attached to the left side sill 31 from below. The front frame 101 of the battery case 86 is connected to the vehicle body 10 from below via a pair of front support brackets 175. The rear frame 102 (see FIG. 4) of the battery case 86 is connected to the vehicle body 10 from below via a pair of rear support brackets 176.

As shown in FIGS. 1, 2, and 5, a head 141b of the attachment bolt 141 penetrates through a through hole 178 of the case cover 87 and comes into contact with the floor panel 23 on the upper side. In addition, a rubber member 181 arranged on the head 141b penetrates through the through hole 178 of the case cover 87 and comes into contact with the floor panel 23 on the upper side.

A female screw 183 of the head 141b is disposed downward in accordance with a mounting hole 184 of the floor panel 23. An attachment bolt 186 is screw-coupled to the female screw 183 of the head 141b through the mounting hole 184 of the floor panel 23. A head 186a of the attachment bolt 186 projects upward from through holes 55a to 58a at the top of the first floor vertical frame 55, the second floor vertical frame 56, the third floor vertical frame 57, and the fourth floor vertical frame 58.

Here, the left and right flanges of the first floor vertical frame 55, the second floor vertical frame 56, the third floor vertical frame 57, and the fourth floor vertical frame 58 are joined to the floor panel 23. Therefore, via the floor panel 23, the battery pack 20 is fixed to the first floor vertical frame 55, the second floor vertical frame 56, the third floor vertical frame 57, and the fourth floor vertical frame 58.

Accordingly, the battery pack 20 is firmly assembled under the floor of the vehicle Ve. In this state, the plurality of vertically-long batteries 85 (also see FIG. 3) of the battery module 82 accommodated in the battery pack 20 are disposed in a state where the longitudinal direction is vertically disposed toward the vehicle-body front-rear direction. Furthermore, the raised portion 87a of the case cover 87 is accommodated in the space 35 formed below the floor tunnel 24.

As described above, according to the vehicle-mounted battery pack 20 according to the embodiment, the battery case 86 is formed in a rectangular shape, and the case vertical direction is disposed along the vehicle-body front-rear direction. The battery module 82 is disposed in the battery case 86. Furthermore, the upper cross member 96 is disposed toward the case vertical direction between the first battery row 127 and the second battery row 128 of the battery module 82, and the upper cross member 96 is fixed to the stepped portions (portions) 85a of the batteries 85 facing each other in the case vertical direction. In addition, the upper deck 97 is disposed in the case vertical direction, and the upper deck 97 is fixed to the front end portion 82a and the rear end portion 82b (both end portions) of the battery module 82 in the case vertical direction.

Therefore, there is no need to separately arrange a connection member that connects the battery module 82 to the upper cross member 96 or the upper deck 97, or the number of connection members can be reduced.

Furthermore, by disposing the upper cross member 96 in the case horizontal direction and disposing the upper deck 97 in the case vertical direction, the upper cross member 96 and the upper deck 97 can be integrally fixed to the battery module 82 in a state of being formed (disposed) in a cross shape in a plan view. Therefore, the battery case 86 formed in a rectangular shape can be reinforced by the upper cross member 96, the upper deck 97, and the battery module 82. Accordingly, for example, the vibration of the battery can be suppressed without increasing the weight.

Particularly, in the case of the battery module 82 in which the first battery row 127 and the second battery row 128 are disposed in a pair in the case vertical direction, the plurality of batteries 85 can be fixed (connected) by the upper cross member 96 in the center of the battery module 82 in the case vertical direction.

In addition, both end portions of the battery module 82, namely the front end portion 82a and the rear end portion 82b, are fixed by the upper deck 97. Accordingly, the vibration in which the central portion of the battery case 86 has the maximum amplitude can be suppressed by the battery module 82, the upper cross member 96, and the upper deck 97.

In addition, the lower cross member 93 is arranged on the case bottom 108 of the case portion 92. Therefore, the plurality of batteries 85 facing each other in the case vertical direction (that is, the battery module 82) can be sandwiched between the upper cross member 96 and the lower cross member 93 in the up-down direction. Accordingly, by the upper cross member 96 and the lower cross member 93, the plurality of batteries 85 facing each other in the case vertical direction can be fixed in the up-down direction. In this way, the battery module 82 can be fixed more firmly by forming the cross member (frame) that is fixed to the battery module 82 into a two-step structure of the upper cross member 96 and the lower cross member 93.

Furthermore, the first skeleton portion 131 of the upper cross member 96 and the second skeleton portion 121 of the lower cross member 93 are portions having high rigidity. Accordingly, by connecting the first skeleton portion 131 of the upper cross member 96 and the second skeleton portion 121 of the lower cross member 93, the battery module 82 can be fixed more firmly by the two-step structure of the upper cross member 96 and the lower cross member 93.

In addition, the front end portion 82a of the battery module 82 is sandwiched and fixed by the front end portion 94a of the first battery frame 94 and the front end portion 97b of the upper deck 97. Furthermore, the rear end portion 82b of the battery module 82 is sandwiched and fixed by the rear end portion 95a of the second battery frame 95 and the rear end portion 97c of the upper deck 97.

Accordingly, by sandwiching the front end portion 82a and the rear end portion 82b (that is, both end portions) of the battery module 82 by the two-step structure, the battery module 82 (particularly, both end portions 82a and 82b of the battery module 82) can be fixed more firmly.

Here, in general, the battery case 86 is required to have rigidity and strength to support the battery module 82, and for example, the battery case 86 needs to be formed by a metal material or be formed to have a thick plate thickness. Therefore, it is difficult to suppress the weight of the battery case 86.

On the other hand, the case cover 87 does not need to support the battery module 82. Therefore, compared with the battery case 86, the case cover 87 can be suppressed in rigidity and strength, and can be formed by a resin material or be formed to have a thin plate thickness to be lightweight.

Incidentally, with regard to the battery case 86 of the embodiment, high rigidity and strength are ensured so as to withstand the vibration of the battery case 86 by fixing the upper deck 97 and the upper cross member 96 to the battery module 82. Thus, the case depth H1 (see FIG. 4) of the battery case 86 is formed to be shallower than the cover depth H2 (see FIG. 3) of the case cover 87. Accordingly, the weight of the battery case 86 can be suppressed in a state where the rigidity and strength are ensured so as to withstand the vibration of the battery case 86.

It should be noted that the technical scope of the disclosure is not limited to the above embodiment, and various modifications can be added without departing from the gist of the disclosure.

In addition, within a range not departing from the gist of the disclosure, the constituent elements in the above embodiment can be appropriately replaced by well-known constituent elements, and the variation examples described above may be appropriately combined.

According to the configuration, the battery case is formed in a rectangular shape, the battery is disposed in the vertical direction along the vehicle-body front-rear direction, and the battery module is disposed in the battery case. Furthermore, the horizontal frame is disposed toward the horizontal direction between the battery rows of the battery module, and the horizontal frame is fixed to the portions of the batteries facing each other in the vertical direction. In addition, the vertical frame is disposed in the vertical direction, and the vertical frame is fixed to both end portions of the battery module in the vertical direction. Besides, the horizontal frame and the vertical frame are formed in a cross shape in a plan view.

Therefore, there is no need to separately arrange a connection member that connects the battery module to the horizontal frame or the vertical frame, or the number of connection members can be reduced.

Furthermore, by disposing the horizontal frame in the horizontal direction and disposing the vertical frame in the vertical direction, the horizontal frame and the vertical frame can be integrally fixed to the battery module in a state of being disposed in a cross shape. Therefore, the battery case formed in a rectangular shape can be reinforced by the horizontal frame, the vertical frame, and the battery module.

Accordingly, for example, the vibration of the battery can be suppressed without increasing the weight.

Particularly, in the case of a battery module in which a pair of battery rows is disposed in the vertical direction, a central portion of the battery module in the vertical direction can be fixed (connected) by the horizontal frame. In addition, both end portions of the battery module in the vertical direction are fixed by the vertical frame. Accordingly, the vibration in which the central portion of the battery case has the maximum amplitude can be suppressed.

The vehicle-mounted battery pack may include a lower horizontal frame (for example, a lower cross member 93 of the embodiment) which is arranged at a bottom (for example, a case bottom 108 of the embodiment) of the battery case and is disposed toward the horizontal direction. The battery module may be fixed by being sandwiched between the horizontal frame and the lower horizontal frame.

According to the configuration, the lower horizontal frame is arranged at the bottom of the battery case, and the battery module is sandwiched between the lower horizontal frame and the horizontal frame and fixed. Accordingly, the battery module can be fixed more firmly by forming the frame that is fixed to the battery module into a two-step structure of the horizontal frame and the lower horizontal frame.

The horizontal frame may include a first skeleton portion (for example, a first skeleton portion 131 of the embodiment), the lower horizontal frame may include a second skeleton portion (for example, a second skeleton portion 121 of the embodiment), and the first skeleton portion and the second skeleton portion may be connected.

According to the configuration, the horizontal frame includes the first skeleton portion, and the lower horizontal frame includes the second skeleton portion. The first skeleton portion and the second skeleton portion are portions having high rigidity. Accordingly, by connecting the first skeleton portion and the second skeleton portion, the battery module can be fixed more firmly by the two-step structure of the horizontal frame and the lower horizontal frame.

The horizontal frame may be formed to have a T-shaped cross section by: the hollow first skeleton portion extending in the horizontal direction, and a pair of first flanges (for example, a first flange 132 of the embodiment) projecting in the vertical direction from both side portions of the first skeleton portion. The lower horizontal frame may be formed to have a T-shaped cross section by: the hollow second skeleton portion extending in the horizontal direction, and a pair of second flanges (for example, a second flange 122 of the embodiment) projecting in the vertical direction from both side portions of the second skeleton portion.

According to the configuration, the horizontal frame is formed to have a T-shaped cross section by the first skeleton portion and the pair of first flanges, and the lower horizontal frame is formed to have a T-shaped cross section by the second skeleton portion and the pair of second flanges. Accordingly, the horizontal frame and the lower horizontal frame can be easily manufactured by, for example, pressing molding.

The vehicle-mounted battery pack may include a battery frame (for example, a first battery frame 94 and a second battery frame 95 of the embodiment) which is arranged at the bottom of the battery case toward the vertical direction and is connected to the lower horizontal frame. The battery module may be fixed to the battery frame.

According to the configuration, the battery frame is arranged at the bottom of the battery case toward the vertical direction and is connected to the lower horizontal frame. The battery module is fixed to the battery frame. Accordingly, the vertically-long battery which is vertically disposed along the vertical direction can be stably fixed by the battery frame.

The vertical frame may be fixed to a central portion (for example, a central portion 96a of the embodiment) of the horizontal frame in the horizontal direction.

According to the configuration, the vertical frame is fixed to the central portion of the horizontal frame. Therefore, the central portion of the horizontal frame can be reinforced by the vertical frame, and the vertical frame can be reinforced by the horizontal frame. Accordingly, the vertically-long battery which is vertically disposed along the vertical direction can be stably fixed by the horizontal frame and the vertical frame.

The vertical frame may include: a hollow skeleton portion (for example, a skeleton portion 151 of the embodiment) which extends in the vertical direction and is formed in a rectangular shape; and a pair of crank portions (for example, a crank portion 152 of the embodiment) which is arranged on both side portions of the skeleton portion and is formed in a crank shape.

According to the configuration, the vertical frame is formed by the hollow skeleton portion and the pair of crank portions. Furthermore, two vertical walls can be formed by forming the hollow skeleton portion in a rectangular shape. In addition, two vertical walls can be formed by forming the pair of crank portions in a crank shape. Therefore, four vertical walls can be formed in the vertical frame. Accordingly, it is possible to ensure high bending rigidity of the vertical frame against the bending stress of the battery case toward an up-down direction.

The vehicle-mounted battery pack may include a bracket (for example, a front connection bracket 161 and a rear connection bracket 171 of the embodiment) by which both end portions of the battery module in the vertical direction are fixed by being clamped together with the battery frame. The vertical frame may be fixed to the bracket.

According to the configuration, both end portions of the battery module in the vertical direction are fixed by being clamped together with the battery frame by the bracket. Furthermore, the vertical frame is fixed to the bracket. Therefore, both end portions of the battery module can be sandwiched and fixed by the battery frame and the vertical frame. Accordingly, the battery module (particularly, both end portions of the battery module) can be fixed more firmly by sandwiching both end portions of the battery module with the two-step structure.

A battery auxiliary machine (for example, a battery auxiliary machine 83 of the embodiment) such as a high-pressure junction board or the like may be mounted on the vertical frame.

Here, when the battery pack is disposed under the floor of the vehicle, for example, the vertical direction of the battery case is disposed along the vehicle-body front-rear direction. In addition, the vertical frame is disposed along the vertical direction of the battery case. Therefore, for example, the vertical frame can be disposed along the lower portion of a floor tunnel of the vehicle.

Thus, in the configuration, the battery auxiliary machine is mounted on the vertical frame. Therefore, the battery auxiliary machine can be accommodated inside the floor tunnel from below. Accordingly, for example, the battery case (that is, the battery pack) can be miniaturized compared with the case where, for example, the battery auxiliary machine is disposed on the front side or the like of the battery module.

Furthermore, by mounting the battery auxiliary machine on the vertical frame, the width of the battery module in the horizontal direction can be suppressed to be small. Therefore, an allowable deformation space (that is, a space for deformation stroke) can be set to be large from the outer edge of the battery module toward the outer side in the vehicle width direction.

Accordingly, for example, when a load (that is, a side collision load) is input to the side portion of the vehicle due to a side collision, side collision energy generated due to the side collision can be sufficiently absorbed in the allowable deformation space, and the battery module can be protected from the side collision load.

The vehicle-mounted battery pack may include a cover (for example, a case cover 87 of the embodiment) which is attached to the battery case and covers the battery module disposed in the battery case. In the battery case, a depth (for example, a case depth H1 of the embodiment) at which the battery module is disposed may be formed to be shallower than a depth of the cover (for example, a cover depth H2 of the embodiment).

Here, in general, the battery case is required to have rigidity and strength to support the battery module, and for example, the battery case needs to be formed by a metal material or be formed to have a thick plate thickness. Therefore, it is difficult to suppress the weight of the battery case.

On the other hand, the cover does not need to support the battery module. Therefore, compared with the battery case, the cover can be suppressed in rigidity and strength, and can be formed by a resin material or be formed to have a thin plate thickness to be lightweight.

Incidentally, with regard to the battery case having this configuration, high rigidity and strength are ensured so as to withstand the vibration of the battery case by fixing the vertical frame and the horizontal frame to the battery module. Thus, the depth of the battery case is formed to be shallower than the depth of the cover. Accordingly, the weight of the battery case can be suppressed in a state where the rigidity and strength are ensured so as to withstand the vibration of the battery case.

According to the disclosure, by reinforcing the battery case by the horizontal frame, the vertical frame, and the battery module, the vibration of the battery can be suppressed without increasing the weight.

What is claimed is:

1. A vehicle-mounted battery pack, comprising:
   a battery case of which a vertical direction is disposed along a vehicle-body front-rear direction, and a horizontal direction is disposed along a vehicle width direction under the floor of a vehicle;
   a battery module in which at least a pair of battery rows is disposed in the vertical direction inside the battery case, wherein in each of the pair of battery rows, a plurality of vertically-long batteries vertically disposed along the vertical direction are disposed in the horizontal direction;
   a horizontal frame which is disposed inside the battery case toward the horizontal direction between the battery rows disposed in the vertical direction, and is fixed to portions of the vertically-long batteries facing each other in the vertical direction; and
   a vertical frame which is disposed inside the battery case in the vertical direction, and is fixed to both end portions of the battery module in the vertical direction; wherein
   the horizontal frame and the vertical frame are formed in a cross shape in a plan view.

2. The vehicle-mounted battery pack according to claim 1, comprising:
   a lower horizontal frame which is arranged at a bottom of the battery case and is disposed toward the horizontal direction, wherein
   the battery module is fixed by being sandwiched between the horizontal frame and the lower horizontal frame.

3. The vehicle-mounted battery pack according to claim 2, wherein
   the horizontal frame comprises a first skeleton portion,
   the lower horizontal frame comprises a second skeleton portion, and
   the first skeleton portion and the second skeleton portion are connected.

4. The vehicle-mounted battery pack according to claim 3, wherein
   the horizontal frame is formed to have a T-shaped cross section by:
   the first skeleton portion extending in the horizontal direction, and
   a pair of first flanges projecting in the vertical direction from both side portions of the first skeleton portion; and
   the lower horizontal frame is formed to have a T-shaped cross section by:
   the second skeleton portion extending in the horizontal direction, and
   a pair of second flanges projecting in the vertical direction from both side portions of the second skeleton portion.

5. The vehicle-mounted battery pack according to claim 2, comprising
   a battery frame which is arranged at the bottom of the battery case toward the vertical direction and is connected to the lower horizontal frame, wherein
   the battery module is fixed to the battery frame.

6. The vehicle-mounted battery pack according to claim 3, comprising
   a battery frame which is arranged at the bottom of the battery case toward the vertical direction and is connected to the lower horizontal frame, wherein
   the battery module is fixed to the battery frame.

7. The vehicle-mounted battery pack according to claim 4, comprising
   a battery frame which is arranged at the bottom of the battery case toward the vertical direction and is connected to the lower horizontal frame, wherein
   the battery module is fixed to the battery frame.

8. The vehicle-mounted battery pack according to claim 1, wherein
   the vertical frame is fixed to a central portion of the horizontal frame in the horizontal direction.

9. The vehicle-mounted battery pack according to claim 2, wherein
   the vertical frame is fixed to a central portion of the horizontal frame in the horizontal direction.

10. The vehicle-mounted battery pack according to claim 3, wherein
    the vertical frame is fixed to a central portion of the horizontal frame in the horizontal direction.

11. The vehicle-mounted battery pack according to claim 4, wherein
    the vertical frame is fixed to a central portion of the horizontal frame in the horizontal direction.

12. The vehicle-mounted battery pack according to claim 5, wherein the vertical frame is fixed to a central portion of the horizontal frame in the horizontal direction.

13. The vehicle-mounted battery pack according to claim 1, wherein the vertical frame comprises:

a hollow skeleton portion which extends in the vertical direction and is formed in a rectangular shape; and a pair of crank portions which are arranged on each side of the skeleton portion and are formed in a crank shape.

14. The vehicle-mounted battery pack according to claim 2, wherein the vertical frame comprises:

a hollow skeleton portion which extends in the vertical direction and is formed in a rectangular shape; and a pair of crank portions which are arranged on each side of the skeleton portion and are formed in a crank shape.

15. The vehicle-mounted battery pack according to claim 3, wherein the vertical frame comprises:

a hollow skeleton portion which extends in the vertical direction and is formed in a rectangular shape; and a pair of crank portions which are arranged on each side of the skeleton portion and are formed in a crank shape.

16. The vehicle-mounted battery pack according to claim 4, wherein the vertical frame comprises:

a hollow skeleton portion which extends in the vertical direction and is formed in a rectangular shape; and a pair of crank portions which are arranged on each side of the skeleton portion and are formed in a crank shape.

17. The vehicle-mounted battery pack according to claim 5, wherein the vertical frame comprises:

a hollow skeleton portion which extends in the vertical direction and is formed in a rectangular shape; and a pair of crank portions which are arranged on each side of the skeleton portion and are formed in a crank shape.

18. The vehicle-mounted battery pack according to claim 5, comprising a bracket by which both end portions of the battery module in the vertical direction are fixed by being clamped together with the battery frame, wherein the vertical frame is fixed to the bracket.

19. The vehicle-mounted battery pack according to claim 1, wherein a battery auxiliary machine comprising a high-pressure junction board is mounted on the vertical frame.

20. The vehicle-mounted battery pack according to claim 1, comprising a cover which is attached to the battery case and covers the battery module disposed in the battery case, wherein in the battery case, a depth at which the battery module is disposed is formed to be shallower than a depth of the cover.

* * * * *